United States Patent [19]

Yokoi et al.

[11] 4,074,266
[45] Feb. 14, 1978

[54] SYSTEM FOR RECEIVING RADIO WAVES THROUGH SINGLE ANTENNA APPARATUS

[75] Inventors: Hiroshi Yokoi, Machida; Takayasu Shiokawa, Yokohama, both of Japan

[73] Assignee: Kokusai Denshin Denwa Kabushiki Kaisha, Japan

[21] Appl. No.: 692,778

[22] Filed: June 4, 1976

[30] Foreign Application Priority Data

June 9, 1975 Japan .................................. 50-68639

[51] Int. Cl.$^2$ ............................................. H04B 7/10
[52] U.S. Cl. ......................... 343/100 SA; 343/16 LS; 343/117 A
[58] Field of Search ................. 325/56, 305, 367, 369; 343/100 SA, 117 A, 16 LS

[56] References Cited

U.S. PATENT DOCUMENTS

| | | | |
|---|---|---|---|
| 2,929,058 | 3/1960 | Blasberg et al. | 343/16 LS |
| 3,036,210 | 5/1962 | Lehan et al. | 325/369 |
| 3,140,490 | 7/1964 | Sichak et al. | 343/117 A |
| 3,357,018 | 12/1967 | Villard, Jr. | 325/369 |
| 3,528,012 | 9/1970 | Kahn | 325/305 |
| 4,005,426 | 1/1977 | White | 325/305 |

Primary Examiner—Samuel W. Engle
Assistant Examiner—S. A. Cangialosi
Attorney, Agent, or Firm—Robert E. Burns; Emmanuel J. Lobato

[57] ABSTRACT

A system for receiving through a single antenna apparatus a direct radio wave and reflected radio waves arriving from the same radio wave source, in which the resultant level of the direct radio wave and the reflected radio waves is detected under a condition where the directivity characteristic of the antenna apparatus is slightly altered at the arrival bearing of the reflected radio waves at intervals sufficiently shorter than that of fading peculiar to the paths of the direct wave and reflected waves, and the directivity characteristic of the antenna apparatus is modified at the arrival bearing of the reflected radio waves to raise the resultant level by the use of error voltages of the above intervals each indicative of the polarity of a difference between the directivity pattern of the antenna apparatus and an optimum pattern.

6 Claims, 21 Drawing Figures

SYSTEM FOR RECEIVING RADIO WAVES THROUGH SINGLE ANTENNA APPARATUS

FIELD OF THE INVENTION

This invention relates to a system for receiving through a single antenna apparatus a direct radio wave and reflected radio waves arriving from the same radio wave source.

BRIEF DESCRIPTION OF THE PRIOR ART

In case of setting sight radio communications, it is a matter of common knowledge to preselect radio wave paths which are free from reflected waves from the sea, buildings or the like, and to minimize the influence of such reflected waves by the employment of an antenna with a sharp directivity pattern.

For example, in a propagation path on the sea, however, there are some occasions where the influence of sea reflection is unavoidable according to the selection of a radio station. Conventional solutions in such a case are, for example, a diversity reception system employing a plurality of antennas, a system designed to combine the directivity patterns of a plurality of antennas with one another to reduce the resultant directivity in the direction to the point of reflection on the sea to substantially zero, etc. However, in a case of applying such diversity system or the like to a ship station in maritime satellite communications or the like or a mobile station in land mobile communications or the like, it is often impossible to employ a plurality of antenna apparatus because of a limitation on the place of installation of communication equipments and from the economical point of view.

BRIEF SUMMARY OF THE INVENTION

An object of this invention is to provide a system for receiving radio waves readily and stably applicable to a ship station in maritime satellite communications or a mobile station in land mobile communications or the like.

Another object of this invention is to provide a system for receiving through a single antenna apparatus a direct radio wave under negligible deterioration of the signal intensity caused by reflected waves.

To attain the above objects and other objects of this invention, the resultant level of the direct radio wave and the reflected radio waves is detected under a condition where the directivity pattern of the antenna apparatus is slightly altered at the arrival bearing of the reflected radio waves, at intervals sufficiently shorter than that of fading peculiar to the paths of the direct wave and the reflected waves. The directivity pattern of the antenna apparatus is deformed at the arrival bearing of the reflected radio waves to raise the resultant level by the use of error voltages of the above intervals each indicative of the polarity of a difference between the directivity pattern of the antenna apparatus and an optimum pattern. In accordance with this invention, energy of the reflected radio waves is possitively utilized to substantially maintain the maximum receiving level of the direct radio wave.

BRIEF DESCRIPTION OF THE DRAWINGS

The principle, construction and operation of this invention will be clearly understood from the following detailed description taken in conjunction with the accompanying drawings, in which.

DETAILED DESCRIPTION OF THE INVENTION

In case of receiving on a ship radio wave from a satellite, the radio wave caught by a shipborn antenna can be indicated by the vector sum $\dot{E}t$ of an electric field component $\dot{E}d$ produced by a direct wave and an electric field component $\dot{E}r$ produced by a reflected wave from the surface of the sea. In a calm sea, the reflected wave can be regarded as one beam but, in a rough sea, the reflected wave spread to a certain extent and arrive in the form of many beams. In this specification, however, the compositions of these reflected wave will be indicated by the single component $\dot{E}r$.

The amplitude of such a field component $\dot{E}r$ and a phase difference $\phi$ between the field components $\dot{E}d$ and $\dot{E}r$ continuously fluctuate in accordance with the sea conditions and the movement of the ship. As a consequence, the composite vector $\dot{E}t$, that is, the amplitude and phase of the received electric field, gently but irregularly fluctuate within a certain range. This is commonly referred to as fading. The phase difference $\phi$ between the field components $\dot{E}d$ and $\dot{E}r$ is the sum of a phase difference $\phi_L$ caused by a difference between respective propagation path lengths of the direct wave and the reflected waves and a phase difference $\phi_A$ caused by a difference between respective phase characteristics of the antenna at respective arrival bearings of the both waves.

Figure 1:
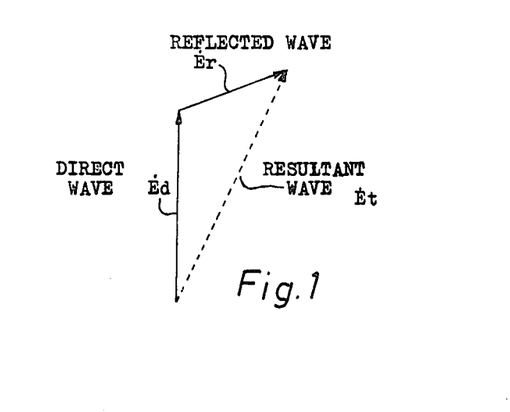
FIG. 1 is a vector diagram showing the amplitude and phase relationship among a direct wave, a reflected wave and their resultant wave.

FIG. 1 is a conceptional showing of the amplitude and phase relationship between a direct wave and a reflected wave. The problem in communication arises in a case where an absolute value ‖$\dot{E}t$‖ of the resultant wave vector is small, that is, a case where an absolute value ‖$\dot{E}r$‖ of a reflected wave is appreciably large while a phase difference between a direct wave vector $\dot{E}d$ and the reflected wave vector $\dot{E}r$ are opposite in phase to each other or a phase difference between them approaches zero.

This invention is proposed to decrease the amplitude of the reflected wave by forcibly changing the directivity pattern of the antenna in substantial directions of the arrival bearings of the reflected waves or to maximize an absolute value ‖$\dot{E}t$‖ of the resultant wave vector by minimizing the phase difference $\phi$ between the direct wave and the reflected wave.

Figure 2A:
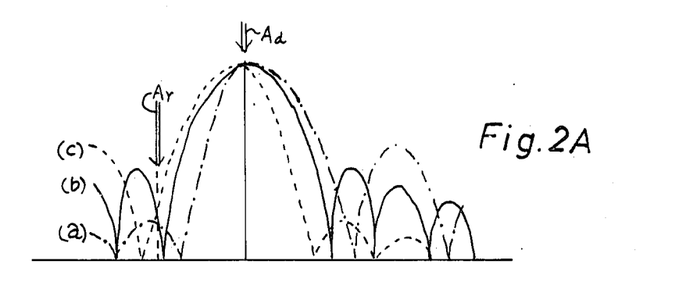
FIGS. 2A and 2B are directivity patterns of antennas explanatory of the principle of this invention.
Figure 2B:
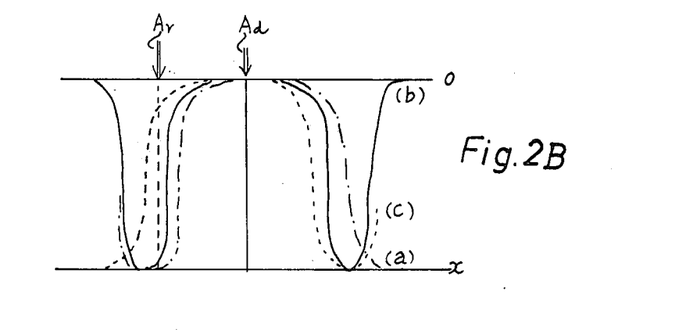

With reference to FIG. 2 and 2B, the principle of this invention will be described. FIG. 2A shows typical examples of various directivity patterns obtained by an antenna apparatus employed in this invention, and FIG. 2B shows phase patterns of the antenna apparatus respectively corresponding to the directivity patterns depicted in FIG. 2A. In this specification, the amplitude patterns and the phase patterns will hereinafter be referred to as the directivity pattern.

Figure 3A:
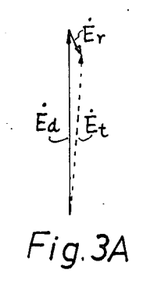
FIGS. 3A, 3B and 3C are vector diagrams explanatory of the principle of this invention.
Figure 3B:
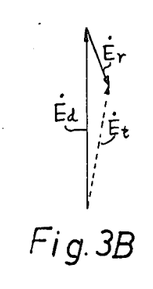

Now, let it be assumed that the directivity pattern of the antenna apparatus has such a characteristic as indicated by a one-dot chain line ($a$) in FIG. 2A and that the direct wave and the reflected wave come from the directions indicated by arrows Ad and Ar in FIG. 2A. Moreover, for convenience of explanation, let it be assumed that a phase difference $\phi_L$ caused by a difference between the respective propagation path lengths of the direct wave and the reflected wave is just equal to $2n\pi$ radians, that is, the both waves happen to arrive at the antenna apparatus in an in-phase relation to each other. In this case, the phase difference between the both waves when they are caught by the antenna apparatus is only a phase difference $\phi_A$ which is determined by the phase pattern of the antenna apparatus shown in FIG. 2B. Accordingly, the resultant wave vector $\dot{E}t$ of the direct wave and the reflected wave becomes such as indicated in FIG. 3A. Next, when the antenna directivity pattern in deformed as shown by a solid line ($b$) in FIG. 2B, the resultant wave vector $\dot{E}t$ becomes such as indicated in FIG. 3B. Further, in case of receiving with such a directivity pattern as indicated by a broken line ($c$) in FIG. 2B, the resultant wave vector $\dot{E}t$ becomes such as indicated in FIG. 3C.

Figure 3C:
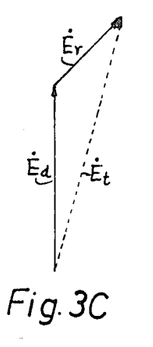

It is seen that particularly in FIG. 3C, the received signal intensity is increased by the reflected wave as compared with that in case of receiving only the direct wave.

In this invention, the antenna directivity pattern is deformed in accordance with such a principle within a certain limited range as shown in FIGS. 2A and 2B by the below-mentioned circuitry, thereby automatically controlling the intensity of the received radio wave so that it may always be maximum.

Next, one embodiment of this invention will be described with reference to FIG. 4. The antenna apparatus 10 employed in the present embodiment comprises four helical elements 1-1, 1-2, 1-3 and 1-4, which are connected respectively through variable phase shifters 2-1, 2-2, 2-3 and 2-4 to a signal combiner 3. This antenna apparatus 10 may be formed with any type of elements and, in this embodiment, the number of the elements used is not limited as far as it is more than two. In a parabolic antenna or the like, a plurality of primary radiators disposed close to one another, can be regarded as these elements.

Figure 4:
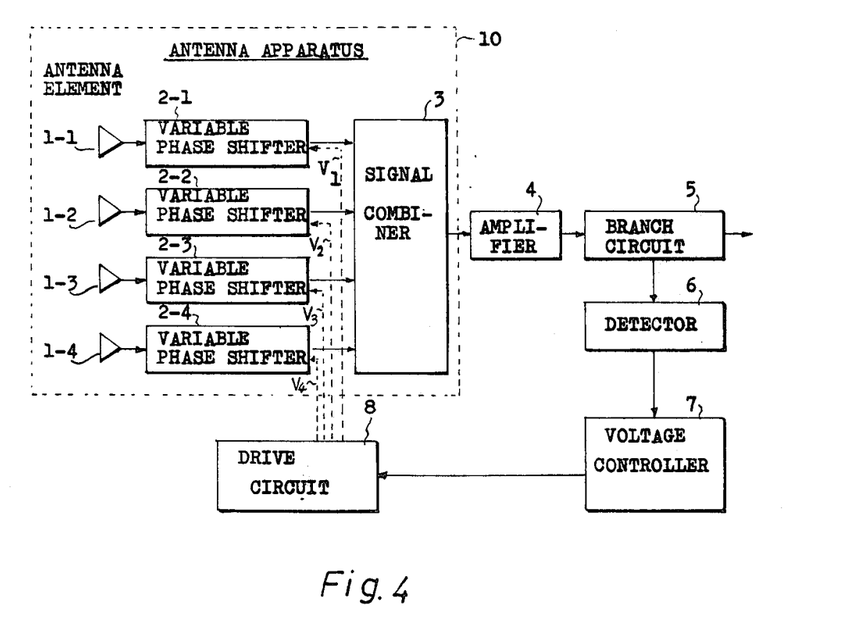
FIG. 4 is a block diagram illustrating an embodiment of this invention.

In FIG. 4, reference character 4 indicates an amplifier; 5 designates a branch circuit for branching a part of the received signal; and 6 identifies a detector. Since the maritime satellite communications employ frequency modulation or pulse code modulation at present, an envelope detector is employed in the present embodiment to detect the received signal level irrespective of modulation types. However, it is also possible to effect square-law detection through a filter by the use of a continuous pilot signal wave from the satellite. Reference character 8 represents a drive circuit for controlling the variable phase shifters 2-1 to 2-4 and 7 denotes a voltage controller for controlling the drive circuit 8 so that the output of the detector 6, that is, the received signal level, may be substantially maximum at all times.

Figure 5:
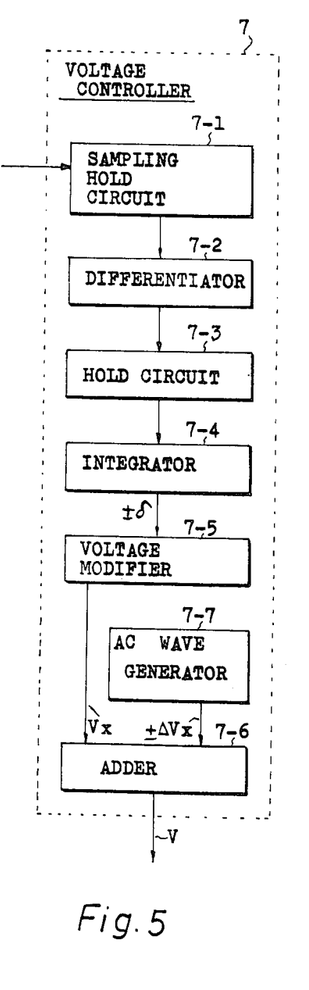
FIG. 5 is a block diagram illustrating an example of a voltage controller employed in this invention.
Figure 6A:
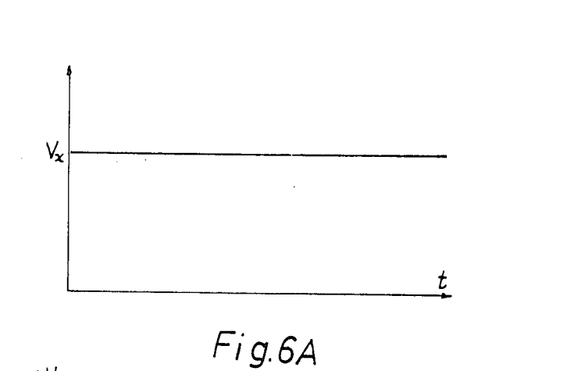
FIGS. 6A, 6B, 6C, 7A, 7B, 7C, 7D and 7E are waveforms explanatory of the operation of the example shown in FIG. 5.
Figure 6B:
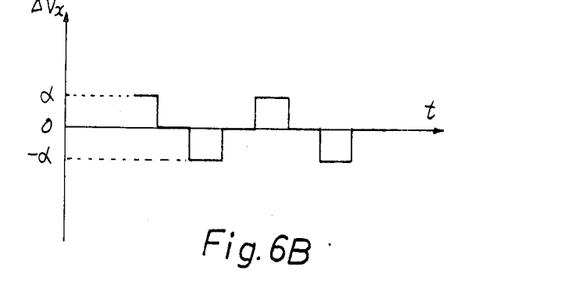
Figure 6C:
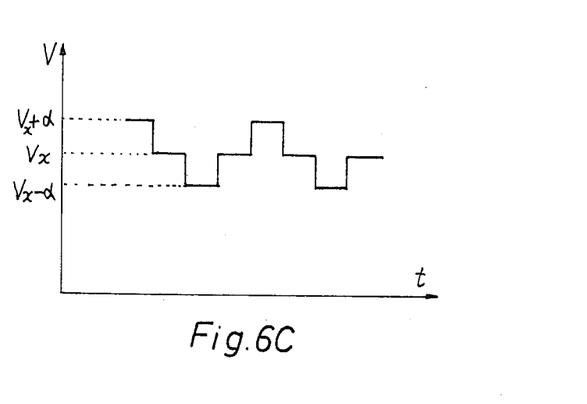
Figure 7A:
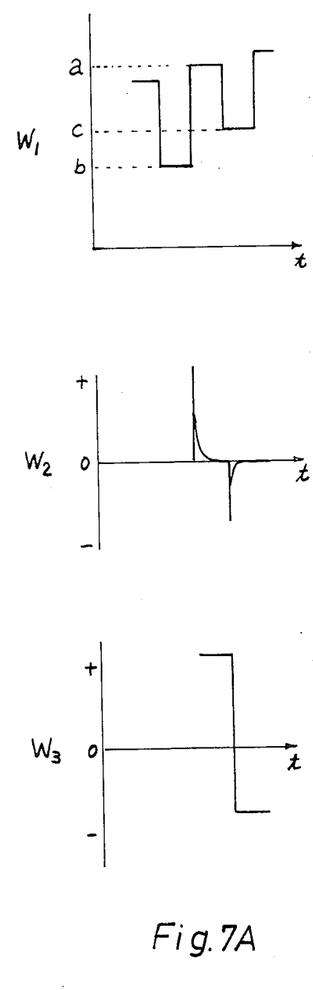
Figure 7B:
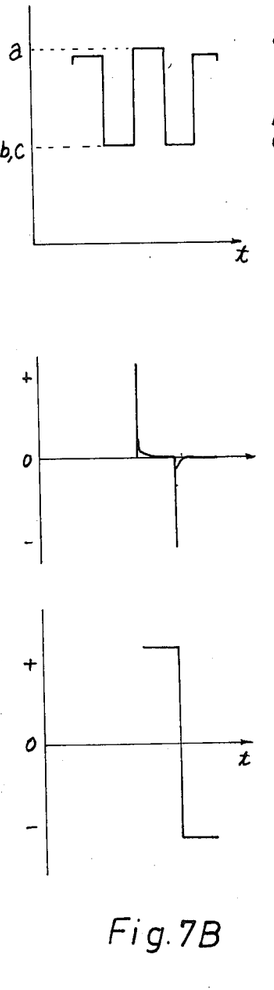
Figure 7C:
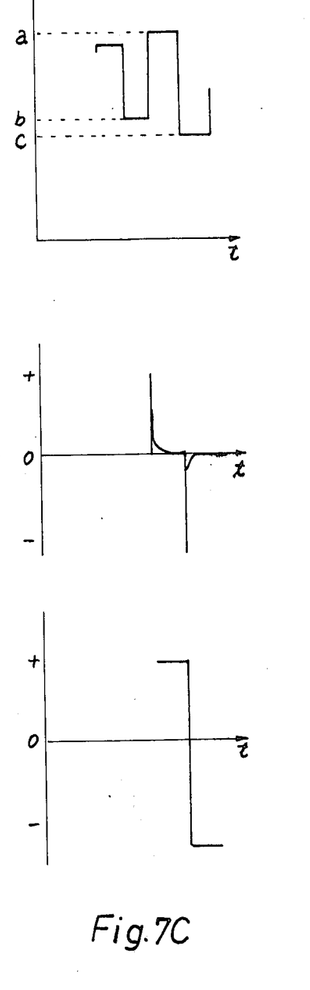

With reference to FIG. 5, an example of the construction of the voltage controller 7 will be described. For convenience of explanation, the control voltage for controlling the drive circuit 8 is indicated as V in the following description. In FIG. 5, reference character 7-6 indentifies an adder by which voltages $\Delta Vx$ and $-\Delta Vx$ produced by an AC wave generator 7—7 are added to a reference control voltage $Vx$ to produce the periodic control voltage V. FIG. 6A shows the waveform of the reference control voltage $Vx$, FIG. 6B the waveforms of the voltages $\Delta Vx$ and $-\Delta Vx$ generated by the AC wave generator 7-7, and FIG. 6C the waveform of the voltage V produced by the addition operation of these voltages in the adder 7-6. In this case, the fluctuation of the control voltage V is caused at a frequency $f$ appreciably higher than that of fading, by which the variable phase shifters 2-1 to 2-4 respectively connected to the antenna elements 1-1 to 1-4 are driven through the drive circuit 8 shown in FIG. 4 to deform the directivity pattern with a period of $\frac{1}{2}\pi f$. Reference character 7-1 in FIG. 5 designates a sampling hold circuit for holding signal levels which are respectively obtained from the detector 6 in case of periodically applying the reference control voltages $Vx$, $Vx-\alpha$ and $Vx+\alpha$ to the drive circuit 8. The waveforms $W_1$ depicted in FIGS. 7A, 7B, 7C, 7D and 7E are output waveforms of the sampling hold circuit 7-1. In the waveforms $W_1$, reference characters $a$, $b$ and $c$ indicate the signal levels respectively corresponding to the control voltages $Vx$, $Vx-\alpha$ and $Vx+\alpha$ for driving the drive circuit 8. By applying the waveform $W_1$ of such signal level to a differentiator 7-2, a pulse voltage $W_2$ having the polarity such as shown in FIGS. 7A to 7E is produced. This pulse voltage $W_2$ is applied to a hold circuit 7-3 to provide such a waveform $W_3$ as depicted in FIGS. 7A to 7E, which is supplied to an integrator 7-4 for producing an error signal voltage. As shown in FIG. 7B, if the signal levels $b$ and $c$ have the respective same values as those in case of applying the reference control voltages $Vx-\alpha$ and $Vx+\alpha$ to the drive circuit 8, it indicates that the reference control voltage $Vx$ is optimum so that the antenna apparatus 10 receives signals with the substantially maximum intensity. However, as depicted in FIGS. 7A and 7C, if either one of the signal levels $b$ and $c$ is higher than the other, an error signal voltage is generated in accordance with its polarity and applied to a voltage modifier 7-5 and replaced by a new reference control voltage $Vx$.

For example, in a case shown in FIG. 7A, a positive error voltage is produced and the reference control voltage $Vx$ is modified by the voltage modifier 7-5 to a value $Vx-\delta Vx$.

Figure 7D:
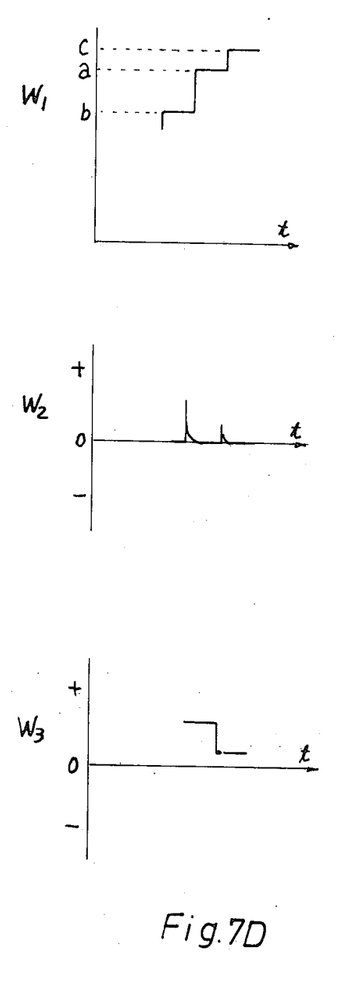
Figure 7E:
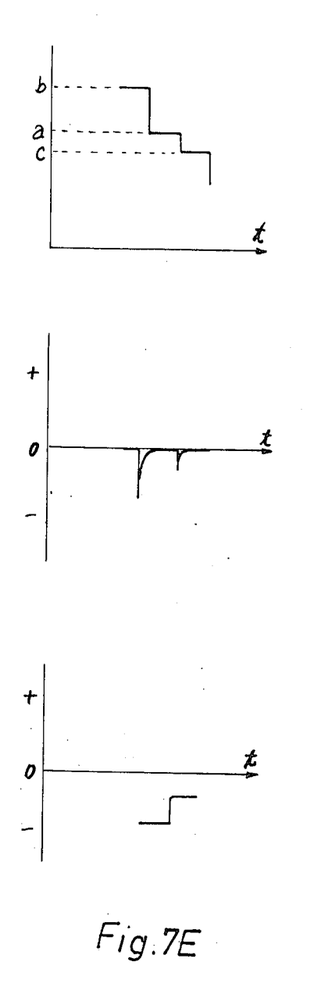

As described above, the control voltage V assuming the value $Vx+$, $Vx$, or $Vx$ for controlling the drive circuit 8 is automatically determined. However, in a case, where the received level is greatly deviated from the maximum signal level due to any cause, for example, by the arrival of reflected waves from a ship having entered the radio wave path or at the initial operation instant, the output waveform of the sampling hold circuit 7-1 becomes such as shown in FIG. 7D or 7E but, also in this case, the control voltage is determined on the same principle of operation as described above.

The voltage controller 7 may be any type of circuit employed in an ordinary automatic control operation as far as it attains the object of this invention. For instance, in the example of FIG. 5, the directivity pattern of the antenna apparatus in the arrival bearing of the reflected wave is slightly and alternately deformed in reverse directions with respecte to the arrival bearing of the reflected wave, but it is also possible to gradually deform the directivity pattern in one direction and to compare the received signal levels before and after each deformation of the directivity pattern, thereby gradually approaching the optimum condition.

Figure 8:
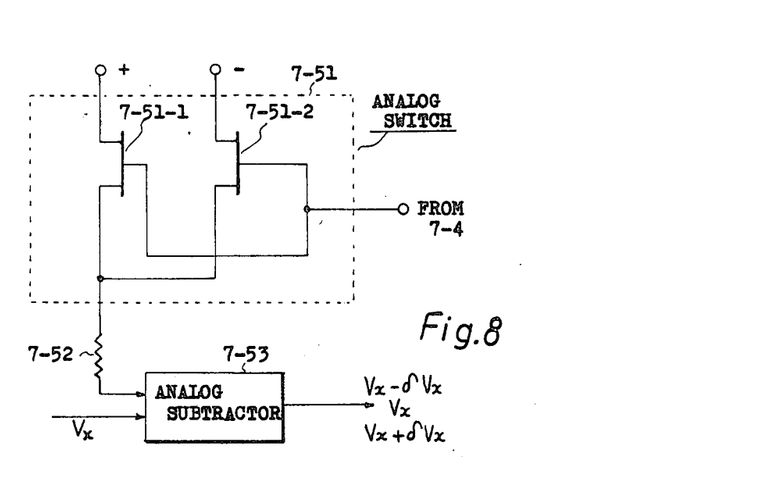
FIG. 8 is a block diagram illustrating an example of a voltage modifier employed in the example shown in FIG. 5.

The voltage modifier 7-5 can be formed, as shown in FIG. 8 by way of example, an analog switch 7-51, a resistor 7-52 and an analog subtractor 7-53. If a plus error voltage ($+\delta$) is applied from the integrator 7-4 to field effect transistors 7-51-1 and 7-51-2, a plus voltage ($+\delta Vx$) is applied to the analog subtractor 7-53 through the field effect transistor 7-51-1 and the resistor 7-52 so that a voltage ($Vx - \delta Vx$) is obtained from the analog subtractor 7-53. However, if a minus error voltage ($-\delta$) is applied to the analog switch 7-51, a minus voltage ($-\delta Vx$) is applied to the analog subtractor 7-53 through the field effect transistor 7-51-2 and the resistor 7-52 so that a voltage ($Vx + \delta Vx$) is obtained from the analog subtractor 7-53. When zero voltage is applied to the analog switch 7-51, the analog subtractor 7-53 produces the voltage $Vx$ since no voltage is produced across the resistor 7-52.

Figure 9:
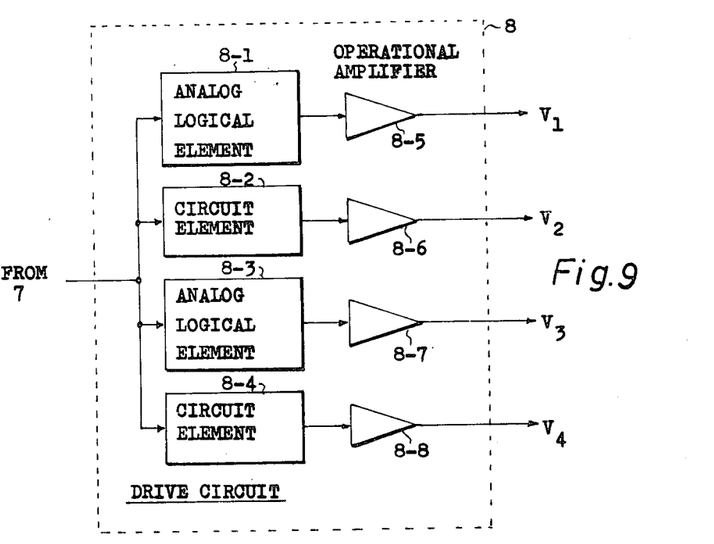
FIG. 9 is a block diagram illustrating an example of a drive circuit employed in this invention.
Figure 10:
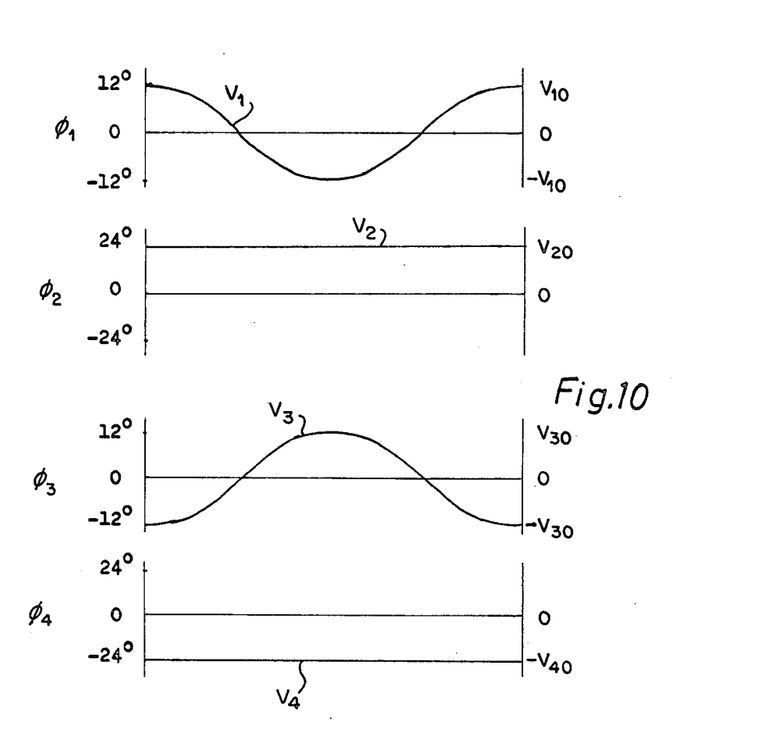
FIG. 10 shows diagrams illustrating phase-shift amounts of the phase shifters shown in FIG. 4 and drive voltages of the drive circuit shown in FIG. 9, which are caused by the output voltage of the voltage controller shown in FIG. 5.

FIG. 9 illustrates an example of the construction of the drive circuit 8, in which the phase shift amounts $\phi_1$, $\phi_2$, $\phi_3$ and $\phi_4$ such, for example, as shown in FIG. 10 are respectively applied to the antenna elements 1-1 to 1-4 in accordance with the value of the control voltage V applied from the voltage controller 7. In this example, the variable phase shifters 2-1 to 2-4 are driven not independently but simultaneously by voltages V1, V2, V3 and V4 respectively in order to simplify the circuit construction.

In FIG. 9, reference characters 8-5, 8-6, 8-7 and 8-8 respectively indicate operational amplifiers; 8-1 and 8-3 designate analog logical elements for producing voltages Cos V and $-$CosV, respectively for the voltage $V_1$ and the voltage $V_3$; and 8-2 and 8-4 identify circuit elements always have a constant output amplitude values V2 and V4 respectively regardless of the value of the control voltage V. The operational amplifiers 8-5, 8-6, 8-7 and 8-8 respectively provide at their terminals drive voltages $V_1$, $V_2$, $V_3$ and $V_4$ necessary for causing the variable phase shifters 2-1 to 2-4 to produce such deviations in the phase shift amounts $\phi 1$, $\phi 2$, $\phi 3$ and $\phi 4$ as shown in FIG. 10. In FIG. 10, the phase shift amounts $\phi 1$ and $\phi 3$ are shown to be deviated in a range of $\pm 12°$ (for ranges of $\pm V10$ and $\pm V30$ of the voltages V1 and V3) in a sine-wave form for the sake of brevity, but a triangular form or a more complicated form of periodic function may be adopted. The phase shift amounts $\phi 2$ and $\phi 4$ are shown in ranges of $\pm 24°$ for ranges of V20 and $-$V40 of the voltages V2 and V4, respectively. For deforming the directivity pattern of the antenna apparatus 10 in the arrival bearing of the reflected waves, the following principle may also be adopted beside the above mentioned circuitry.

Figure 11:
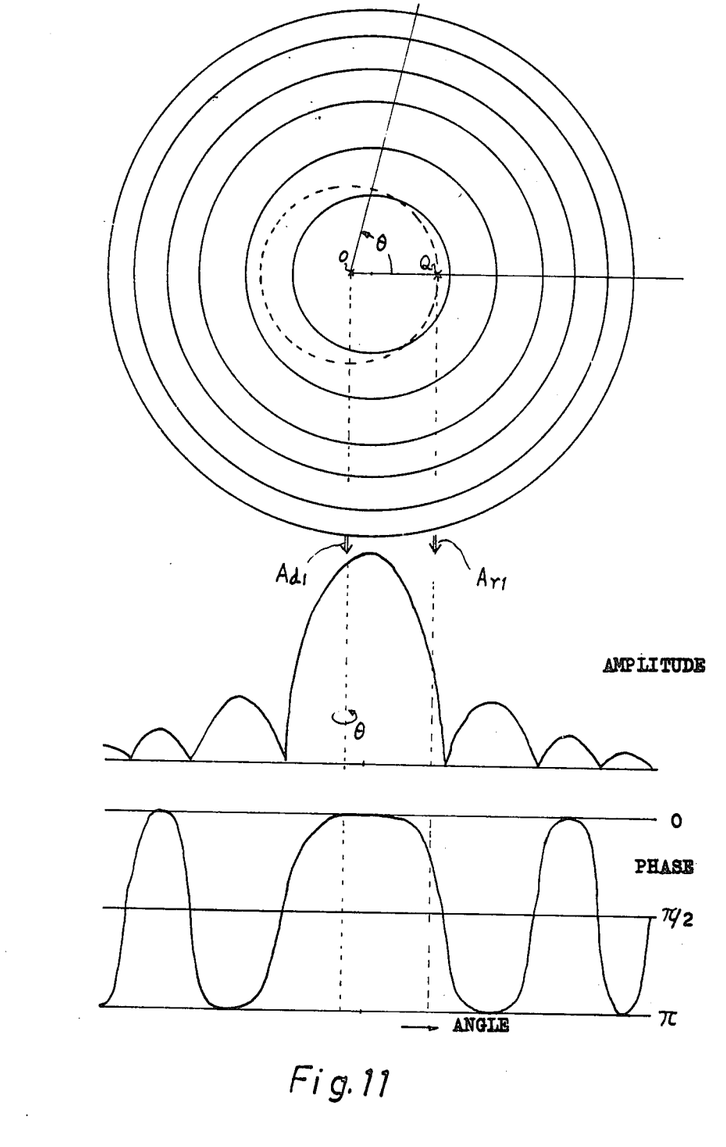
FIG. 11 is an example of the directivity pattern of an antenna apparatus employed in this invention.

FIG. 11 illustrates another example of the directivity pattern of the antenna apparatus 10 and its contours. In FIG. 11, the arrival bearing of the direct wave is identified as O and the equevalent arrival bearing of the reflected waves is identified as Q. In this case, the central direction of the antenna main beam is set in a direction a little deviated from the arrival bearing $Ad_1$ and $Ar_1$ of the both waves as illustrated. Thus, by rotating the axis of the antenna apparatus to the right or left direction about the direction O, the amplitude and phase patterns of the antenna apparatus with respect to the arrival bearing Q of the reflected wave can be altered. Accordingly, it is sufficient only to rotate the antenna axis so that the received signal may become maximum.

Figure 12:
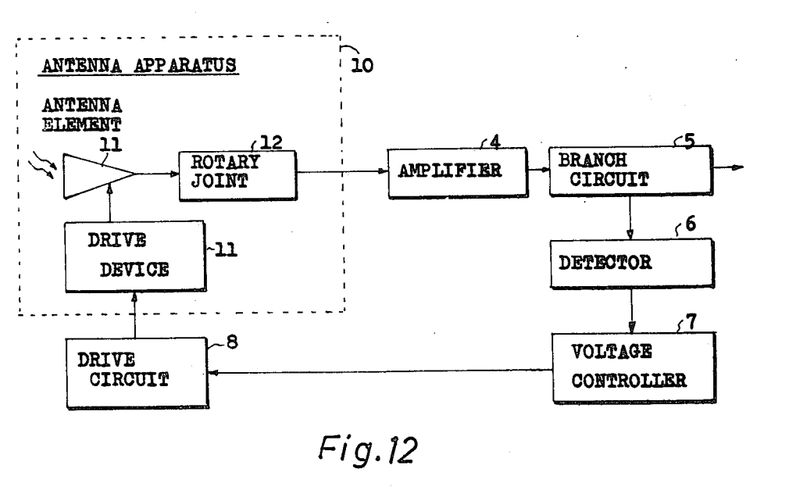
FIG. 12 is a block diagram illustrating another embodiment of this invention.

FIG. 12 illustrates another embodiment of this invention for attaining the above principle. Reference character 11 designates a drive device for rotating the antenna axis, such for example, as a servo motor. Reference character 12 denotes a rotary joint. The other circuits 4, 5, 6, 7 and 8 are identical with those in FIG. 4.

As is easily seen from FIG. 12, the rotational angles of the antenna apparatus 10, taken as $\theta$, $\theta + \Delta\theta$, and $\theta - \Delta\theta$, correspond to $\phi$, $\phi + \Delta\phi$ and $\phi - \Delta\phi$ described previously with regard to FIG. 4 and are controlled as that in FIG. 4 to be maintained in the vicinity of the optimum angle $\theta$ so that the received wave may always be substantially maximum. It is a matter of course that the angle $\theta$ may have any value in the range of 0° to 360°.

In FIG. 11, the directivity pattern of the antenna apparatus 10 is symmetrical with respect to the antenna axis but, in many of ordinary antennas, the directivity pattern is asymmetry on axis. In such a case, it is also possible to rotate the antenna pattern about the arrival bearing of the direct wave at which the main beam is maximum.

In case of adopting the system of rotating the antenna pattern as mentioned above, even if the antenna used is composed of only one element having no phase control device in its feeding circuit as in a case of, for example, a parabolic antenna, this invention can easily be embodied. In an antenna apparatus having a plurality of elements, it is also possible to previously make the antenna pattern asymmetrical as shown by (b) and (c) in FIGS. 2A and 2B and to rotate it.

As has been described in detail, this invention is characterized in that the received wave intensity is always made maximum within a certain limited range by deforming the antenna radiation pattern or displacing an asymmetrical radiation pattern previously deformed.

It is apparent that this invention is widely applicable not only to the maritime satellite communication but also to land mobile communication, maritime relay, etc..

What we claim is:

1. A system for receiving a direct wave simultaneously with reflected waves arriving from the same radio wave source comprising:
    an antenna apparatus capable of deforming its directivity pattern;
    first control means connected to said antenna apparatus for deforming by a very small amount, at intervals sufficiently shorter than that of fading peculiar to the paths of the direct wave and the reflected waves, the directivity pattern of said antenna apparatus at the arrival bearing of the reflected waves;
    detection means connected to said antenna apparatus for detecting the resultant level of the direct wave and the reflected waves at said intervals to provide error voltages each indicative of the polarity of a difference between the directivity pattern of said antenna apparatus and an optimum pattern; and second control means connected to said first control means and said detection means for controlling said first control means by a control voltage produced from said error voltages to deform the directivity pattern of said antenna apparatus, thereby increasing the resultant level of the direct wave and the reflected waves and substantially maintaining the maximum value of said resultant level.

2. A system according to claim 1, in which said antenna apparatus comprises a plurality of antenna elements, a plurality of variable phase shifters respectively connected to said antenna elements, and a signal combiner connected to said variable phase shifters for obtaining the output of said antenna apparatus, said variable phase shifters being controlled by said first control means.

3. A system according to claim 1, in which said antenna apparatus comprises a single antenna, a drive device coupled to said antenna for rotating said antenna about the axis of said antenna, and a rotary joint connected to said antenna to obtain the output of said antenna, said drive device being controlled by said first drive means.

4. A system according to claim 2, in which said first drive means comprises two analog logical circuits respectively producing a plus cosine output of said control voltage and a minus cosine output of said control voltage, two circuit elements respectively producing constant voltages from said control voltage, four operational amplifiers respectively connected to said two analog logical circuits and said two circuit elements, an AC wave generator for generating an AC wave, and an adder connected to said second control means and said AC wave generator for superposing said AC wave on said control voltage.

5. A system according to claim 1, in which said detecting means and said second control means comprise an envelope detector for providing said resultant level, a sampling hold circuit for sampling and holding the detected resultant level from said envelope detector at said intervals, a differentiator connected to said sampling hold circuit for obtaining differentiated pulses from the output of said sampling hold circuit, a hold circuit connected to said differentiator for successively holding the peak values of said differentiated pulses to provide a hold voltage, an integrator connected to said hold circuit for integrating the hold voltage to provide an integrated voltage, and a voltage modifier connected to said integrator to provide said control voltage from said integrated voltage.

6. A system according to claim 5, in which said voltage modifier comprises two analog switches respectively producing a plus-modified control voltage and a minus-modified control voltage in response to the plus value and the minus value of said integrated voltage, a dc source for producing a constant voltage, and a subtractor having two inputs respectively connected to said two analog switches and said dc source, said control voltage being obtained from the output of said subtractor.

* * * * *